United States Patent
Green et al.

(10) Patent No.: US 11,975,708 B2
(45) Date of Patent: May 7, 2024

(54) SYSTEM AND METHOD OF CALIBRATING AN INERTIAL MEASUREMENT UNIT ON A VEHICLE

(71) Applicant: Ground Transportation Systems Canada Inc., Ontario (CA)

(72) Inventors: Alon Green, Ontario (CA); Kevin Tobin, Ontario (CA); Marco De Thomasis, Ontario (CA); Andrei Bucsa, Ontario (CA)

(73) Assignee: GROUND TRANSPORTATION SYSTEMS CANADA INC., Toronto (CA)

( * ) Notice: Subject to any disclaimer, the term of this patent is extended or adjusted under 35 U.S.C. 154(b) by 95 days.

(21) Appl. No.: 17/735,817

(22) Filed: May 3, 2022

(65) Prior Publication Data

US 2022/0348188 A1    Nov. 3, 2022

Related U.S. Application Data (60) Provisional application No. 63/183,392, filed on May 3, 2021.

(51) Int. Cl.
| | |
|---|---|
| *B60W 30/00* | (2006.01) |
| *B60W 30/02* | (2012.01) |
| *B60W 40/12* | (2012.01) |

(52) U.S. Cl.
CPC ............ *B60W 30/02* (2013.01); *B60W 40/12* (2013.01)

(58) Field of Classification Search
CPC ......... B60W 30/02; B60W 40/12; G01C 9/00; G01C 25/005
See application file for complete search history.

(56) References Cited

U.S. PATENT DOCUMENTS

| | | |
|---|---|---|
| 6,263,733 B1 | 7/2001 | Reimer et al. |
| 7,526,402 B2 | 4/2009 | Tanenhaus et al. |
| 9,250,086 B1 | 2/2016 | Friend et al. |
| 9,421,474 B2 | 8/2016 | Derby, Jr. |
| 9,524,268 B2 | 12/2016 | Crane, III et al. |
| 10,081,376 B2 | 9/2018 | Singh |
| 10,495,456 B2 | 12/2019 | Vennegeerts et al. |

(Continued)

FOREIGN PATENT DOCUMENTS

| | | |
|---|---|---|
| CN | 109779614 A | 5/2019 |
| CN | 111025330 A | 4/2020 |
| CN | 212409723 U | 1/2021 |

OTHER PUBLICATIONS

International Search Report and Written Opinion issued in corresponding International Application No. PCT/IB2022/054089, dated Jun. 20, 2022, pp. 1-8, Canadian Intellectual Property Office, Quebec, Canada.

(Continued)

*Primary Examiner* — Peter D Nolan
*Assistant Examiner* — Peter Y Ning
(74) *Attorney, Agent, or Firm* — HAUPTMAN HAM, LLP (57) ABSTRACT

Systems and methods of calibrating an Inertial Measurement Unit (IMU) on a vehicle are disclosed. In some embodiments, a first tilt angle of the IMU is measured with the IMU while the vehicle is stationary. A second tilt angle of the IMU (Continued)

is measured with an inclinometer or tilt sensor while the vehicle is stationary. The orientation of the IMU is corrected based on the first tilt angle and the second tilt angle.

20 Claims, 7 Drawing Sheets

(56) References Cited

U.S. PATENT DOCUMENTS

| | | | |
|---|---|---|---|
| 2013/0158940 A1* | 6/2013 | Crane, III | G01C 9/02 |
| | | | 702/141 |
| 2014/0122016 A1 | 5/2014 | Friend | |
| 2014/0299416 A1 | 10/2014 | Jakes | |
| 2014/0309960 A1* | 10/2014 | Vennegeerts | G01C 15/002 |
| | | | 702/104 |
| 2016/0054131 A1* | 2/2016 | Friend | G01S 19/14 |
| | | | 701/472 |
| 2017/0146667 A1* | 5/2017 | Medagoda | G01C 25/00 |
| 2019/0376786 A1* | 12/2019 | Oglesby | G01B 21/042 |
| 2020/0200537 A1 | 6/2020 | Ceisel et al. | |
| 2020/0333468 A1 | 10/2020 | Liu et al. | |
| 2020/0348136 A1* | 11/2020 | Jain | G01C 21/16 |
| 2021/0132108 A1* | 5/2021 | Schauer | G01P 15/08 |
| 2022/0392232 A1* | 12/2022 | Aguiar | G01S 7/4972 |

OTHER PUBLICATIONS

TE Sensor Solutions, Using Sensor Fusion to Improve the Performance of Tilt Sensors, Jan. 1, 2020, pp. 1-7.

Mohamed Moussa, Adel Moussa 1,2 and Naser El-Sheimy, Steering Angle Assisted Vehicular Navigation Using Portable Devices in GNSS-Denied Environments, Sensors 2019, 19, 1618; doi:10.3390/s19071618, Apr. 4, 2019, pp. 1-18.

Qijin Chen, Quan Zhang, and Yahao Cheng, Railway Track Irregularity Measuring by GNSS/INS Integration, Mar. 1, 2015, Article in Navigation—Journal of The Institute of Navigation, pp. 1-16.

Dirk Dennig, Johannes Bureick, Johannes Link, Dmitri Diener, Christian Hesse and Ingo Neumann, Comprehensive and Highly Accurate Measurements of Crane Runways, Profiles and Fastenings, May 13, 2017, Sensors 2017, 17, 1118, doi:10.10.3390/s17051118, ages 1-19.

M L Hoang, A Pietrosanto, A New Technique on Vibration Optimization of Industrial Inclinometer for MEMS Accelerometer Without Sensor Fusion, Feb. 4, 2021, IEEE Access, vol. 9, 2021, pp. 20295-20304.

Vasiliy M. Tereshkov, An Intuitive Approach to Inertial Sensor Bias Estimation, Dec. 1, 2012, Article in the International Journal of Navigation and Observation, pp. 1-7.

* cited by examiner

SYSTEM AND METHOD OF CALIBRATING AN INERTIAL MEASUREMENT UNIT ON A VEHICLE

PRIORITY CLAIM

The present application claims the priority of U.S. Provisional Application No. 63/183,392, filed May 3, 2021, the entirety of which is incorporated herein by reference.

BACKGROUND

An Inertial Measurement Unit (IMU) measures directional forces along at least one measurement axis. IMUs are often mounted on guideway mounted vehicles and their force measurements used to track the location of the vehicle. The calibration of IMUs has been performed manually in the past in a maintenance depot/yard, by mechanically aligning the measurement axis of the IMU with the orientation axis. Aligning the measurement axis of the IMU with the orientation axis of the IMU is done within an accepted tolerance so that the vehicles location is tracked accurately.

BRIEF DESCRIPTION OF THE DRAWINGS

Aspects of the present disclosure are best understood from the following detailed description when read with the accompanying figures. In accordance with the standard practice in the industry, various features are not drawn to scale. In fact, the dimensions of the various features are arbitrarily increased or reduced for clarity of discussion.

DETAILED DESCRIPTION

The following disclosure provides many different embodiments, or examples, for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows may include embodiments in which the first and second features are formed in direct contact, and further include embodiments in which additional features are formed between the first and second features, such that the first and second features are unable to be in direct contact. In addition, the present disclosure repeats reference numerals and/or letters in the various examples. This repetition is for the purpose of simplicity and clarity and does not dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein are likewise interpreted accordingly.

The present disclosure describes systems and methods of calibrating an inertial measurement unit (IMU) on a guideway mounted vehicle. In some embodiments, the IMU is calibrated using an inclinometer or tilt sensor. A tilt angle is measured by an inclinometer or tilt sensor at a known location. Linear acceleration is measured by an accelerometer with the IMU (i.e., IMUs usually contain an accelerometer, a gyroscope, and magnetometer). The linear acceleration measured by the accelerometer is compared with the tilt angle measured by the inclinometer and the orientation of the IMU is corrected based on the comparison. This technique is repeated at stops of the guideway vehicle to ensure that the IMU remains calibrated throughout a trip.

In some embodiments, the tilt angle measured by the inclinometer or tilt sensor is compared with a recorded tilt angle at the known location. In some embodiments, the recorded tilt angle was measured previously by the same inclinometer or tilt sensor or by the inclinometer or tilt sensor on another guideway mounted vehicle. In some embodiments, the recorded tilt angle is measured by specialized equipment to obtain a highly accurate reading. Liquid capacitive tilt sensors are extremely accurate in stationary conditions (i.e., within approximately 1 µrad or $10^{-6}$ radian, where 1 radian equals 180/pi degrees). In some embodiments, an AC bias (e.g., oscillations or a jerk) in the linear acceleration measured by the accelerometer are removed. Once removed, the corrected tilt angle is compared to the recorded tilt angle. The IMU is recalibrated in response to the difference between the corrected tilt angle and the recorded tilt angle being greater than a threshold as this indicates an installation error. In some embodiments, an alarm signal is generated by the IMU in response to the difference between the corrected tilt angle and the recorded tilt angle being greater than the threshold.

Figure 1A:
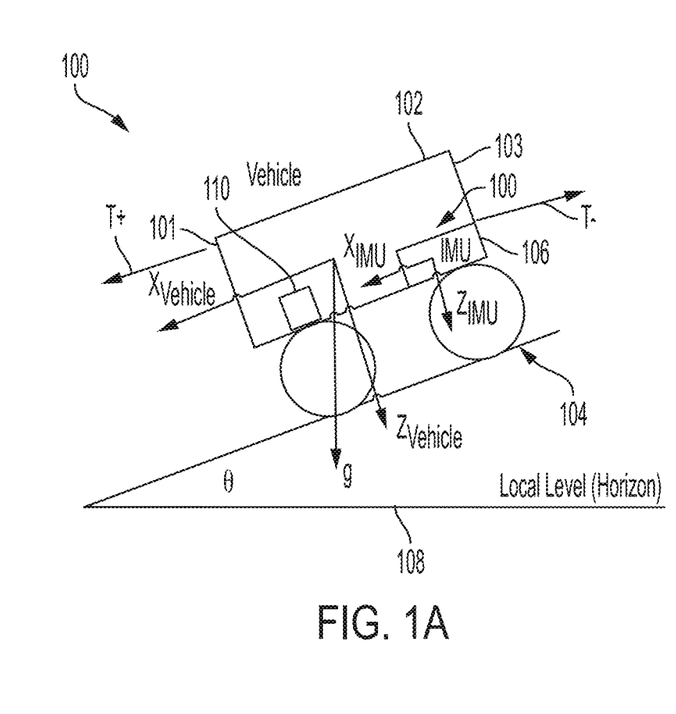
FIG. 1A-FIG. 1B are views of an inertial calibration system, in accordance with some embodiments.
Figure 1B:
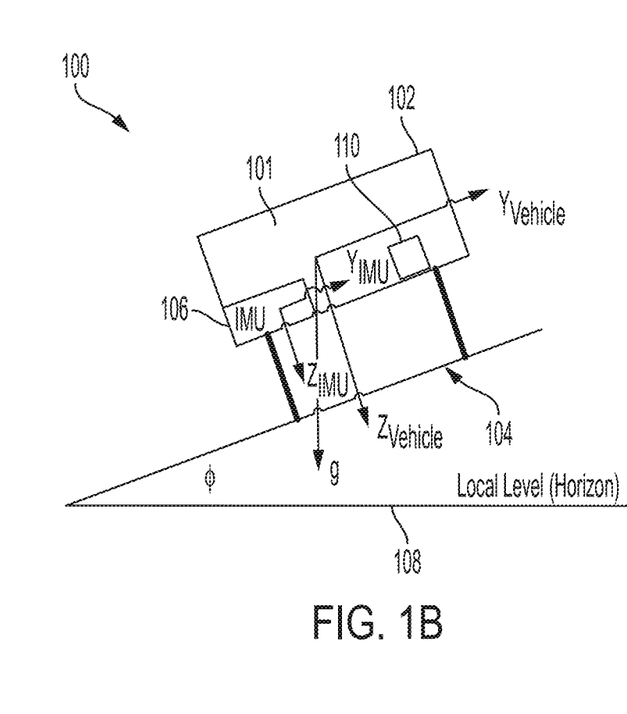

FIG. 1A-FIG. 1B are views of an inertial calibration system 100, in accordance with some embodiments.

The inertial calibration system 100 is mounted in a guideway mounted vehicle 102 that is mounted along a guideway 104. As shown in FIG. 1A, the vehicle 102 either moves in a direction normal to end 101 (direction T+) or moves in a direction (T−) normal at another end 103 of the vehicle 102. The end 101 is opposite to end 103. An orientation axis, specifically referred to as an X-vehicle axis, extends parallel to the directions T+, T− of movement of the vehicle 102.

Another orientation axis, specifically referred to as a Y-vehicle axis, extends out of the lateral sides of the vehicle 102. The Y-vehicle axis is orthogonal to the X-vehicle axis of the vehicle 102.

Yet another orientation axis, specifically referred to as a Z-vehicle axis, extends out of the top and bottom of the vehicle 102. The Z-vehicle axis is orthogonal to the Y-vehicle axis and the X-vehicle axis. FIG. 1A is looking into the Y-vehicle axis of the vehicle 102 and FIG. 1B is looking into the X-vehicle axis of the vehicle 102.

The guideway mounted vehicle 102 moves along a guideway 104 such as a track, rail, monorail, road, or the like. The vehicle 102 is a train, subway, monorail, or another path-constrained vehicle, including automobiles or buses that have been configured to move along a constrained path in the direction T+ and the direction T−.

The inertial calibration system 100 includes an Inertial Measurement Unit (IMU) 106. The IMU 106 is configured to measure the acceleration of the vehicle 102 to calculate a location of the vehicle 102. As shown in FIG. 1A and FIG. 1B, the IMU 106 at another end 103 of the vehicle 102. The end 101 is opposite to end 103. A measurement axis, specifically referred to as an X-IMU axis, extends parallel to the front and back of the IMU 106. When the IMU 106 is perfectly calibrated, the X-IMU axis is parallel to the orientation axis X-vehicle axis. In this manner, the IMU 106 measures the acceleration of the vehicle 102 relative to the X-vehicle axis.

Another measurement axis, specifically referred to as a Y-IMU axis, extends out of the lateral sides of the IMU 106. The Y-IMU axis is orthogonal to the X-IMU axis of the vehicle 102. When the IMU 106 is perfectly calibrated, the Y-IMU axis is parallel to the orientation axis Y-vehicle axis. For purposes of the present discussion, perfectly calibrated references the goal to make the misalignment between the IMU X/Y/Z axis and the corresponding vehicle X/Y/Z axis less than a certain threshold, or alternatively to measure misalignment for computation correction. In this manner, the IMU 106 measures the acceleration of the vehicle 102 relative to the Y-vehicle axis.

Yet another measurement axis, specifically referred to as a Z-IMU axis, extends out of the top and bottom of the IMU 106. The Z-IMU axis is orthogonal to the X-IMU axis and the Y-IMU axis of the vehicle 102. When the IMU 106 is perfectly calibrated, the Z-IMU axis is parallel to the orientation axis Z-vehicle axis. In this manner, the IMU 106 measures the acceleration of the vehicle 102 relative to the Z-vehicle axis.

The X-IMU axis is never perfectly aligned with the X-vehicle axis. To calibrate the IMU 106, either the IMU misalignment with the vehicle is below a certain threshold or accurately measured to support computed compensation. Assuming that the vehicle 102 is on perfectly flat ground and the X-vehicle axis is perfectly aligned with the X-IMU axis, the Y-IMU axis is aligned with the Y-vehicle axis and the Z-IMU axis is aligned with the Z-IMU axis.

In FIG. 1A and FIG. 1B, the vehicle sits on an incline, where the gravity vector g is the force of gravity. The gravity vector along the x axis (gsinθ) is not a bias. The gravity vector is measured by the accelerometer of the IMU 106 in response to the train being stopped. In this situation, the accelerometer measures the braking force. When the train starts moving along the tracks the gravity vector is in free fall and the inclinometer/tilt sensor is unable to measure the gsinθ component. When the orientation of the X-IMU axis, Y-IMU axis, and the Z-IMU axis are unaligned with the X-vehicle axis, Y-vehicle axis, and the Z-vehicle axis due to the incline, the gravity vector g results in a constant inclination or tilt (referred to as a "DC component") that is measured by the inclinometer/tilt sensor 110 as a result of the misalignment resulting from the orientation of the X-IMU axis, Y-IMU axis, and the Z-IMU axis are unaligned with the X-vehicle axis, Y-vehicle axis, and the Z-vehicle axis due to the incline. Additionally, the orientation of the X-IMU axis, Y-IMU axis, and the Z-IMU axis become misaligned with the X-vehicle axis, Y-vehicle axis, and the Z-vehicle axis due to vibrations (e.g., linear acceleration measured by the accelerometer) of the vehicle 102. The vibrations of the vehicle 102 also result in linear acceleration (referred to as a "AC component") which is the acceleration due to misalignment resulting from the orientation of the X-IMU axis, Y-IMU axis, and the Z-IMU axis vibrating with respect to the X-vehicle axis, Y-vehicle axis, and the Z-vehicle axis.

FIG. 1A illustrates the vehicle 102 looking into the X-vehicle, Z-vehicle plane. A local horizon 108 that represents perfectly flat ground is shown in FIG. 1A. The vehicle 102 is misaligned with the local horizon 108 by a grade angle θ because of the incline. The gravity vector g results in a DC component due to the steady state grade angle θ. Vibrations of the vehicle 102 result in changes in the grade angle θ and an AC component.

FIG. 1B illustrates the vehicle 102 looking into the Y-vehicle, Z-vehicle plane. A local horizon 108 that represents perfectly flat ground is shown in FIG. 1B. The vehicle 102 is misaligned with the local horizon 108 by a cant angle Φ because of the incline. The gravity vector g results in a DC component due to the steady state cant angle Φ. Vibrations of the vehicle 102 result in linear acceleration in the cant angle Φ and an AC component.

To correctly calibrate the IMU 106, the inertial calibration system 100 includes an inclinometer/tilt sensor 110. There are different technologies to implement inclinometers. For example, micro-electromechanical systems (MEMS) accelerometers, piezoelectric accelerometers, tilt sensors, and liquid capacitive tilt sensors. When stationary, the liquid capacitive tilt sensor provides absolute measurements of the incline angles. With MEMS accelerometers, the incline angles are calculated based on the measured acceleration. Piezoelectric accelerometers are unable to be used to calculate the incline angles as they measure the AC acceleration and not the DC steady state acceleration. A tilt sensor is a device configured to use a heavy moving part, acted on by gravity, to estimate the inclination (on all axis) in static condition and is unable to estimate acceleration.

In some embodiments, the accelerometer within IMU 106 is a three dimensional (3D), two dimensional (2D) and single axis accelerometer. For the discussion below, when discussing calibrating the IMU using a linear acceleration component measured by the accelerometer is used. The accelerometer is used to estimate vehicle movement based on acceleration variation, nevertheless a verification is determined that all 3 axes are aligned on to obtain a correct estimation. In response to a reason the alignment has changed (due to various mechanical reasons), inclinometer 110 is used to recalibrate IMU 106 in stationary conditions (as inclinometer 110 is mechanically coupled with IMU 106 and relative positions do not change in time).

With respect to the X-vehicle, Z-vehicle plane, the inclinometer 110 is configured to measure a tilt angle while the vehicle 102 is stationary at a known location. With respect to the X-vehicle, Z-vehicle plane, the inclinometer/tilt sensor 110 is configured to measure a tilt angle of the vehicle 102 while stationary. The tilt angle measured by the inclinometer/tilt sensor 110 corresponds with the grade angle θ. During calibrations, the orientation of the X-IMU axis and Z-IMU axis are rotated, either physically to align the IMU with the inclinometer or computationally by a dedicated function using the inclinometer misalignment, in accordance with the tilt angle measured by the inclinometer/tilt sensor 110 to correct the orientation of the IMU 106 in the X-vehicle, Z-vehicle plane.

With respect to the Y-vehicle, Z-vehicle plane, the inclinometer/tilt sensor 110 is configured to measure a tilt angle of the vehicle 102 while stationary. The tilt angle measured by the inclinometer/tilt sensor 110 corresponds with the cant angle Φ. During calibrations, the orientation of the Y-IMU axis and Z-IMU axis are rotated, either physically to align the IMU with the inclinometer or computationally by a dedicated function using the inclinometer misalignment, in accordance with the tilt angle measured by the inclinometer/tilt sensor 110 in the to correct the orientation of the IMU 106 in the Y-vehicle, Z-vehicle plane.

In some embodiments, to determine whether the calibration of the vehicle 102 was performed correctly, the inclinometer 110 is configured to again measure a tilt angle of the vehicle 102 while stationary at another known location. With respect to the X-vehicle, Z-vehicle plane, the inclinometer/tilt sensor 110 is configured to again measure a tilt angle of the vehicle 102 while stationary. The tilt angle measured by the inclinometer/tilt sensor 110 corresponds with the grade angle θ at the other known location. In response to the difference between tilt angle of the IMU 106 and the tilt angle of the inclinometer or the tilt sensor 110 being within a threshold, the IMU 106 is considered to have been calibrated correctly with respect to X-vehicle, Z-vehicle plane. In response to the difference between the tilt angle of the IMU 106 and the tilt angle of the inclinometer/tilt sensor 110 being larger than the threshold, the IMU 106 is recalibrated.

With respect to the Y-vehicle, Z-vehicle plane, the inclinometer/tilt sensor 110 is configured to again measure a tilt angle of the vehicle 102 while stationary. The tilt angle measured by the inclinometer/tilt sensor 110 corresponds with the cant angle Φ at the other known location. In response to the difference between the tilt angle of the IMU 106 and the tilt angle of the inclinometer or the tilt sensor 110 being within a threshold, the IMU 106 is considered to have been calibrated correctly with respect to X-vehicle, Z-vehicle plane. In response to the difference between the tilt angle of the IMU 106 and the tilt angle of the inclinometer/tilt sensor 110 being larger than the threshold, the IMU 106 is recalibrated.

In some embodiments, a tilt angle is measured with the inclinometer or tilt sensor 110 while the vehicle 102 is stationary at a known location with respect to the X-vehicle, Z-vehicle plane. Furthermore, an angular orientation of the IMU 106 is measured at the known location with respect to the X-vehicle, Z-vehicle plane. The intent is to calculate the IMU orientation using the 3D accelerometer when the train is stopped The orientation angle of the IMU 106 consists of a DC component. The accelerometer is capable to measure the AC component. Subtracting the accelerometer measurements from the tilt sensor measurements removes the AC component. A recorded tilt angle is received by the IMU 106 from a database. The recorded tilt angle is a tilt angle at the known location that was measured previously. For example, in some embodiments, the recorded tilt angle is measured very precisely with the appropriate equipment. Subtracting the linear acceleration measured by the accelerometer from the tilt angle with respect to the X-vehicle, Z-vehicle plane to generate a corrected tilt angle. As such, this removed the AC component in the tilt angle measurement with respect to the X-vehicle, Z-vehicle plane. As such, the corrected tilt angle has the DC steady state component, in accordance with some embodiments. The recorded tilt angle is compared with the corrected tilt angle to determine a calibration error of the IMU with respect to the X-vehicle, Z-vehicle plane. In some embodiments, the IMU 106 generates an alarm signal in response to the difference between the recorded tilt angle and the corrected tilt angle being greater than a threshold. In some embodiments, the IMU 106 is recalibrated in response to the difference between the recorded tilt angle and the corrected tilt angle being greater than a threshold.

In some embodiments, a tilt angle is measured with the inclinometer or tilt sensor 110 while the vehicle 102 is stationary at a known location with respect to the Y-vehicle, Z-vehicle plane. Furthermore, an linear acceleration of the IMU 106 is measured at the known location with respect to the Y-vehicle, Z-vehicle plane. Subtracting the linear acceleration measured by the accelerometer from the IMU 106 consist of a DC and AC components in the measurement. A recorded tilt angle is received by the IMU 106 from a database. The recorded tilt angle is a tilt angle at the known location that was measured previously. For example, in some embodiments, the recorded tilt angle is measured precisely with the appropriate equipment. The linear acceleration subtracted from the tilt angle with respect to the Y-vehicle, Z-vehicle plane generates a corrected tilt angle. As such, this removes the AC bias in the tilt angle measurement with respect to the Y-vehicle, Z-vehicle plane. As such, the corrected tilt angle only has the DC steady state component, in accordance with some embodiments. The recorded tilt angle is compared with the corrected tilt angle to determine a calibration error of the IMU with respect to the X-vehicle, Z-vehicle plane. In some embodiments, the IMU 106 generates an alarm signal in response to the difference between the recorded tilt angle and the corrected tilt angle being greater than a threshold. In some embodiments, the IMU 106 is recalibrated in response to the difference between the recorded tilt angle and the corrected tilt angle being greater than a threshold.

In some embodiments, when the vehicle 102 is stationary at a known location, the inclinometer or tilt sensor 110 measures the grade angle θ and cant angle Φ.

In some embodiments, the grade angle θ is determined to be equal to the tilt angle measured by the inclinometer or tilt sensor 110 with respect to the X-vehicle, Z-vehicle plane. In some embodiments, the cant angle Φ is determined to be equal to the tilt angle measured by the inclinometer or tilt sensor 110 with respect to the Y-vehicle, Z-vehicle plane.

The measured grade and cant angles are compared with the grade and cant angles stored in the database (i.e., θDB and ΦDB, respectively), in case the vehicle's position is known, and the difference represents the IMU installation error and the bias too, in consideration of the inclinometer or tilt sensor 110 alignment with the IMU 106, the accuracy of the inclinometer or tilt sensor 110, the accuracy of the grade and cant angles stored in the database.

The vehicle's body tilt with respect to the bogie because of the grade and cant angles.

$$\Theta \text{ Installation error\_Bias} = \theta - \theta DB \pm \text{two (2) arc-minutes})(2/60°) \pm \theta DB\_Err \pm \theta Body\text{-}Bogie(\theta, \Phi)$$

$$\Phi \text{ Installation error\_Bias} = \Phi M - \Phi DB \pm \text{two (2) arc-minutes})(2/60°) \pm \Phi DB\_Err \pm \Phi Body\text{-}Bogie(\theta, \Phi)$$

θDB_Err is the error in the grade angle stored in the database and ΦDB_Err is the error in the cant angle stored in the database.

θBody-Bogie (θ, Φ) is the longitudinal vehicle's body tilt with respect to the bogie because of the grade and cant angles θ, Φ, and Φ Body-Bogie(θ, Φ) is the lateral vehicle's body tilt with respect to the bogie because of the grade and cant angles θ, Φ.

The IMU installation errors (i.e., θ Installation error and Φ Installation error) are the steady state component.

The IMU installation errors (i.e., θ Installation error and Φ Installation error) are stored in a configuration file and will be used to correct (compensate) the IMU specific force (acceleration) measurements and orientation.

The inclination and linear acceleration measurements are used by the positioning and odometry functions of the vehicle 102 to correct IMU measurements.

In some embodiments, the calibration check(s) discussed above are repeated at every location that the vehicle stops at to check that the IMU installation error is within bounds. For example, the threshold for the IMU installation error is ±ten (10) arcminutes)(1/6°) in some embodiments.

In some embodiments, the inclinometer or tilt sensor data is collocated in the IMU 106. In this manner, the errors in the orientation of the IMU 106 of the measurement axes (X-IMU, Y-IMU, Z-IMU) are measured directly by the inclinometer or tilt sensor 110.

This inclinometer or tilt sensor 110 utilizes diverse components to measure the grade and cant angles θ, Φ. For example, in some embodiments the IMU 106 includes an accelerometer with microelectromechanical systems (MEMS) sensors to measure the grade and tilt references θ, Φ. In some embodiments, the MEMS sensors are used in combination with the accelerometer to determine the grade and cant angles θ, Φ. In some embodiments, the inclinometer or tilt sensor 110 is a ratio-metric capacitive tilt sensor. In response to the ratio-metric capacitive tilt sensor is tilted the liquid inside remains leveled (with respect to the local gravity) however, with respect to the tube itself liquid is not leveled any more. Therefore, the measured capacitance is proportional to the tilt angle.

Figure 2A:
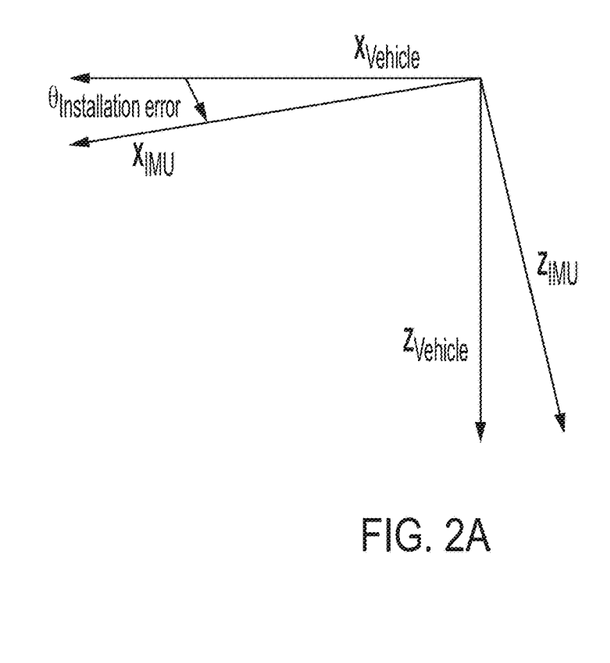
FIG. 2A and FIG. 2B are graphs of the orientation error of the IMU as a result of inclination, in accordance with some embodiments.
Figure 2B:
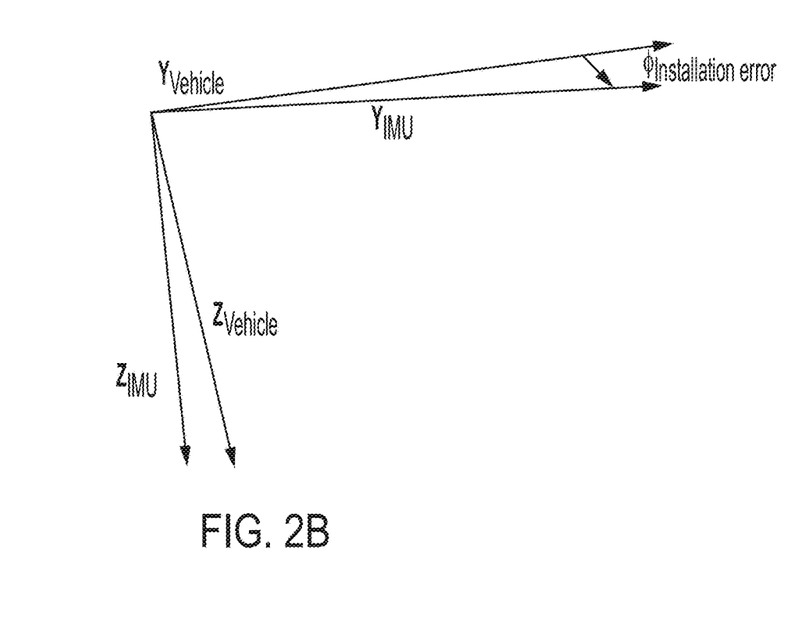

FIG. 2A and FIG. 2B are graphs illustrating the orientation error of the IMU 106 because of inclination, in accordance with some embodiments.

FIG. 2A illustrates the orientation error of the IMU 106 when viewed into the X-vehicle, Z-vehicle plane. FIG. 2B illustrates the orientation error of the IMU when viewed into the Y-vehicle, Z-vehicle plane.

As shown in FIG. 2A, the grade angle θ-installation error is an angle resulting from a rotation between the X-vehicle and X-IMU axes and the Z-vehicle and Z-IMU axes due to inclination. As shown in FIG. 2B, the cant angle Φ -installation error is an angle resulting from a rotation between the Y-vehicle and Y-IMU axes and the Z-vehicle and Z-IMU axes due to inclination. In some embodiments, the IMU 106 includes an accelerometer and the X-IMU, Y-IMU, Z-IMU axes are measurement axes for the accelerometer.

Figure 3A:
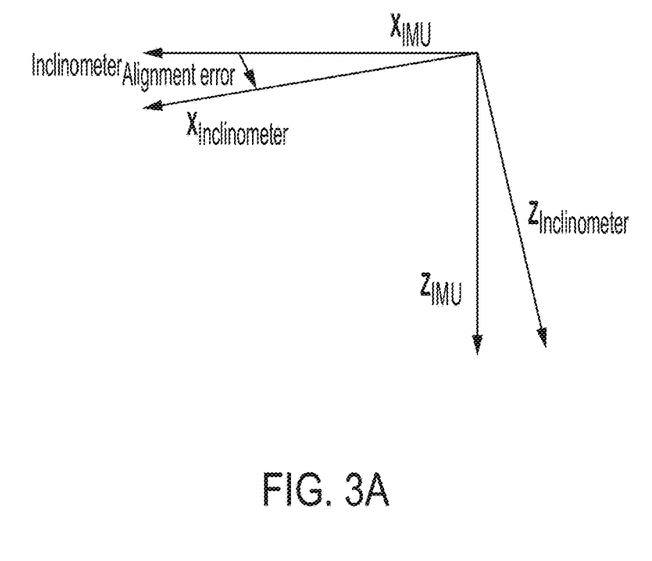
FIG. 3A and FIG. 3B are graphs of the orientation error of the IMU as measured by the inclinometer or tilt sensor, in accordance with some embodiments.
Figure 3B:
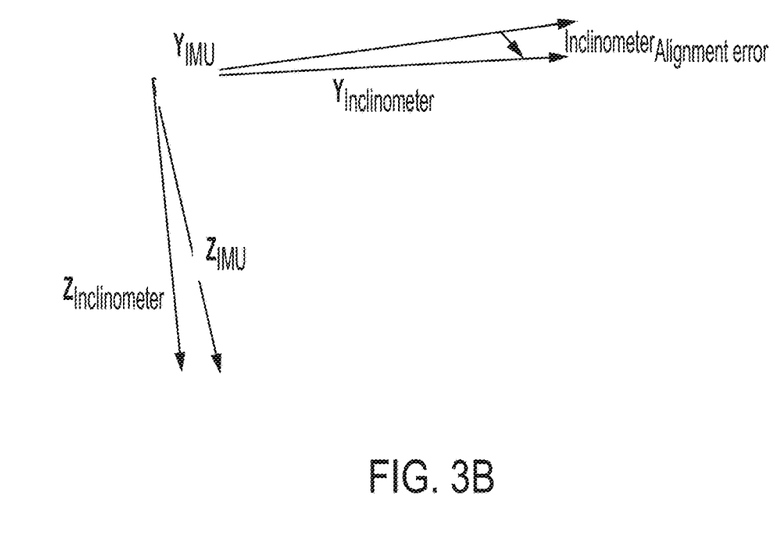

FIG. 3A and FIG. 3B are graphs illustrating the orientation error of the IMU 106 as measured by the inclinometer or tilt sensor 110, in accordance with some embodiments.

A measurement axis, specifically referred to as an X-inclinometer axis, extends parallel to the front and back of the inclinometer or tilt sensor 110. Another measurement axis, specifically referred to as a Y-inclinometer axis, extends out of the lateral sides of the inclinometer or tilt sensor 110. Yet another measurement axis, specifically referred to as a Z-inclinometer axis, extends out of the top and bottom of the inclinometer or tilt sensor 110.

As shown in FIG. 3A, the grade angle θ-inclinometer between the measurement axis X-IMU and the measurement axis X-inclinometer (between the measurement axis Z-IMU and the measurement axis Z-inclinometer) is an alignment error between the IMU 106 and the inclinometer or tilt sensor 110. As shown in FIG. 3B, the cant angle Φ-inclinometer between the measurement axis X-IMU and the measurement axis X-inclinometer (between the measurement axis Z-IMU and the measurement axis Z-inclinometer) is an alignment error between the IMU 106 and the inclinometer or tilt sensor 110.

The misalignment between the IMU's XIMU-YIMU-ZIMU axes and the tilt sensor or inclinometer XInclinometer-YInclinometer-ZInclinometer axes are due to the installation error of the IMU 106 within the IMU enclosure, in response to the IMU 106 and the inclinometer or tilt sensor 110 are located on vehicle 102. In response to the IMU 106 and the inclinometer or tilt sensor 110 are collocated on vehicle 102, the installation error indicates the calibration error. In response to the IMU 106 and the inclinometer or tilt sensor 110 are in different enclosures, the misalignment error is due to the IMU 106 installation error in the vehicle 102. Thus, the installation error indicates the calibration error.

With reference to FIGS. 2A-2B and FIGS. 3A-3B, FIGS. 2A-2B relate FIGS. 3A-3B for detecting and correcting the calibration error. The objective is to accurately measure the orientation difference between the IMU and the vehicle either to physically align the IMU (e.g., during the installation process) with the vehicle or measure the misalignment and then perform computational correction. The tilt sensor provides absolute tilt angle while the train is stopped. Any difference is a result of the IMU bias or the misalignment and should be compensated for.

Figure 4:
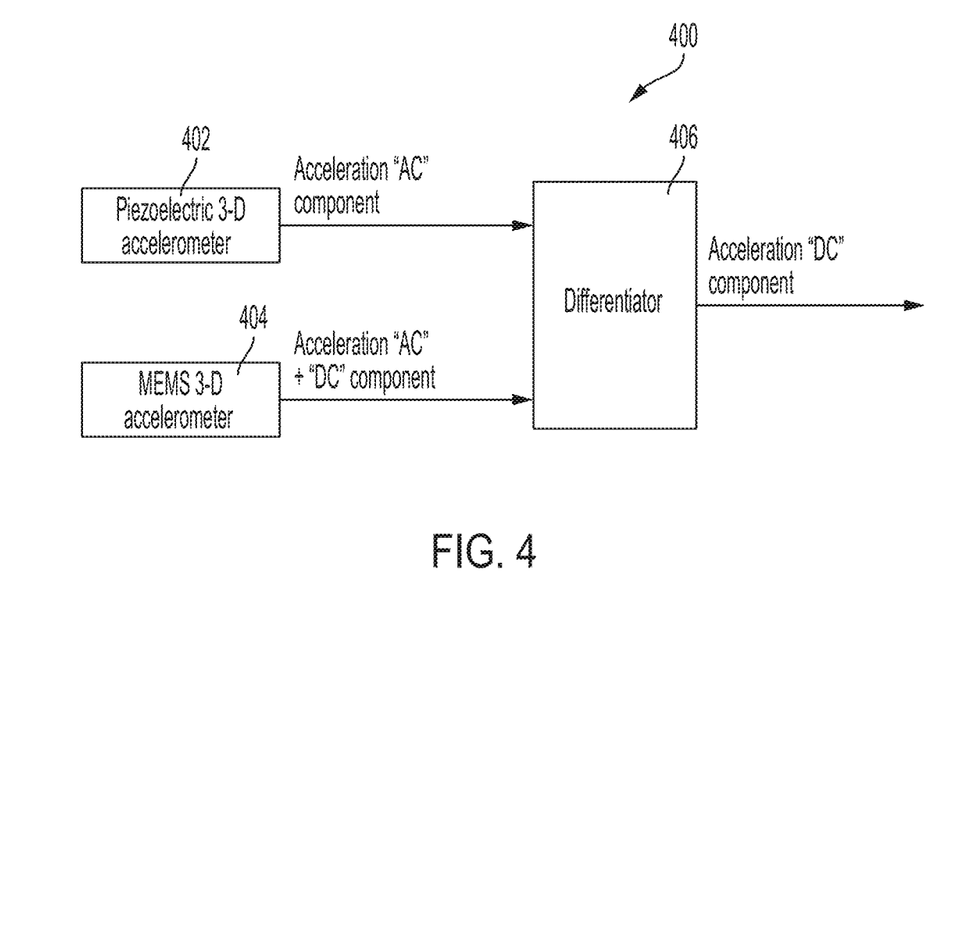
FIG. 4 illustrates components in one embodiment of an inclinometer or tilt sensor, in accordance with some embodiments.

FIG. 4 illustrates components in one embodiment of an inclinometer or tilt sensor 400, in accordance with some embodiments.

The inclinometer or tilt sensor 400 is an example of the inclinometer or tilt sensor 110 shown in FIG. 1. In this embodiment, the inclinometer or tilt sensor 400 includes a piezoelectric three dimensional (3-D) accelerometer 402 and a MEMS 3-D accelerometer 404. The piezoelectric 3-D accelerometer 402 measures the AC component along the X-inclinometer axis. The piezoelectric 3-D accelerometer 402 measures the AC component along the Y-inclinometer axis. The piezoelectric 3-D accelerometer 402 measures the AC component along the Z-inclinometer axis. The MEMS 3-D accelerometer 404 measures the AC component and DC component along the X-inclinometer axis. The MEMS 3-D accelerometer 404 measures the AC component and DC component along the Y-inclinometer axis. The MEMS 3-D accelerometer 404 measures the AC component and DC component along the Z-inclinometer axis.

The inclinometer or tilt sensor 400 also includes a differentiator 406. The differentiator 406 is configured to receive the output of the piezoelectric 3-D accelerometer 402 and the output of the MEMS 3-D accelerometer 404. The differentiator 406 subtracts the AC component along the X-inclinometer axis measured by the piezoelectric 3-D accelerometer 402 from the AC and DC components measured by the MEMS 3-D accelerometer 404 along the X-inclinometer axis. The output of the differentiator 406 thus includes only the DC component along the X-inclinometer axis without the AC component. The differentiator 406 subtracts the AC component measured along the Y-inclinometer axis by the piezoelectric 3-D accelerometer 402 from the AC and DC components measured by the MEMS 3-D accelerometer 404 along the Y-inclinometer axis. The output of the differentiator 406 thus includes the DC component along the Y-inclinometer axis without the AC component. The differentiator 406 subtracts the AC component measured along the Z-inclinometer axis by the piezoelectric 3-D accelerometer 402 from the AC and DC components measured by the MEMS 3-D accelerometer 404 along the Z-inclinometer axis. The output of the differentiator 406 thus only includes the DC component along the Z-inclinometer axis without the AC component. In this manner, the output of the inclinometer or tilt sensor 400 only includes the DC component in some embodiments. The DC component which is the steady state acceleration representing the train motion is then used to correct the orientation of the IMU 106.

Figure 5:
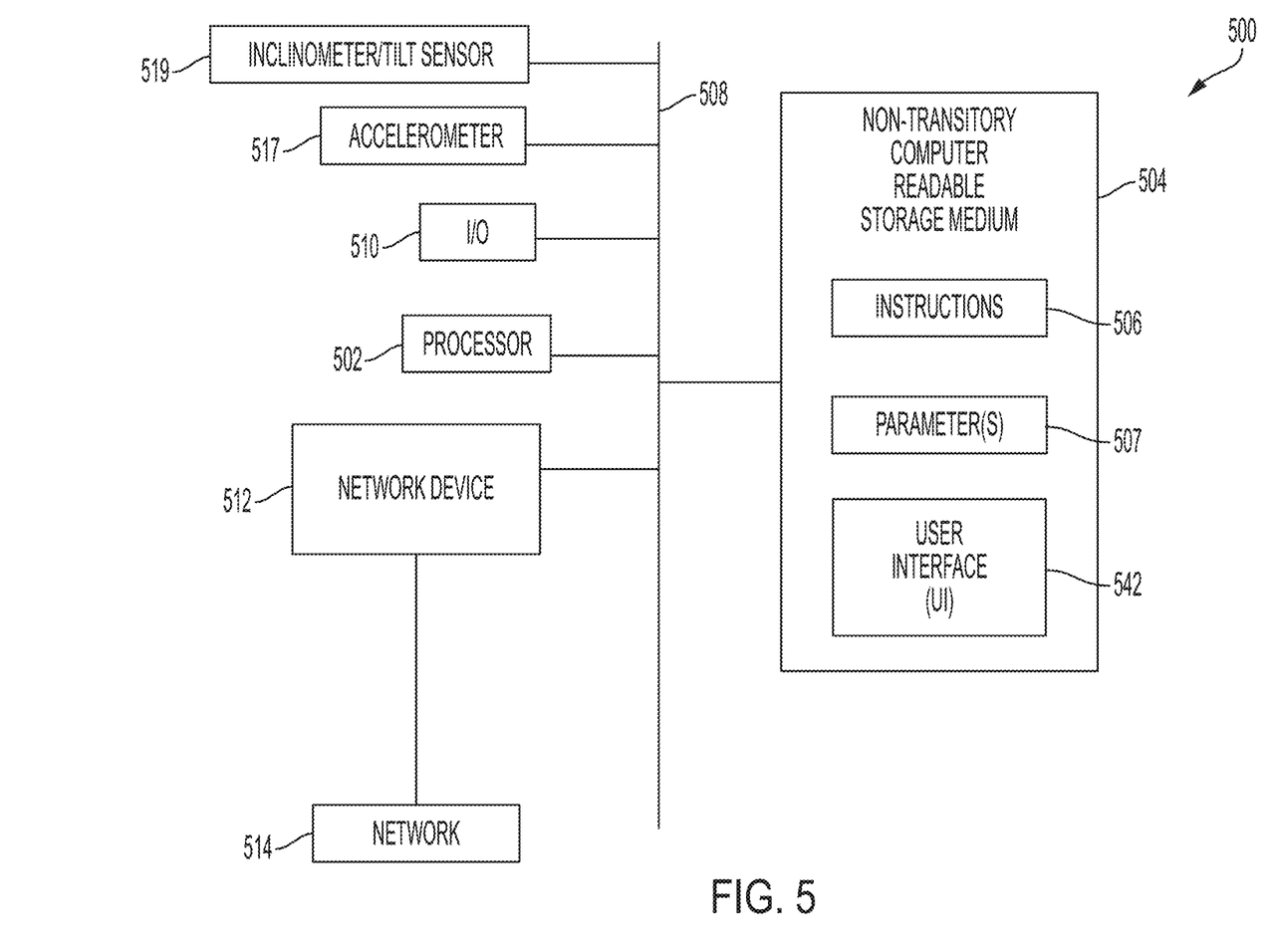
FIG. 5 is a block diagram of an inertial calibration system, in accordance with some embodiments.

FIG. 5 is a block diagram of an inertial calibration system 500, in accordance with some embodiments.

In some embodiments, the IMU 106 in FIG. 1A and FIG. 1B has the configuration of the inertial calibration system 500 shown in FIG. 5.

In some embodiments, inertial calibration system 500 includes a general-purpose computing device including a hardware processor 502 and a non-transitory, computer-readable storage medium 504. Computer-readable storage medium 504, amongst other things, is encoded with, i.e., stores, computer program code 506, i.e., a set of executable instructions. Execution of computer program code 506 by hardware processor 502 represents (at least in part) a vehicle localization and speed determination tool which implements a portion or all of the methods described herein in accordance with one or more embodiments (hereinafter, the noted processes and/or methods).

Processor 502 is electrically coupled to computer-readable storage medium 504 via a bus 508. Processor 502 is also electrically coupled to an I/O interface 510 by bus 508. A network device 512 is also electrically connected to processor 502 via bus 508. Network device 512 is connected to a network 514, so that processor 502 and computer-readable storage medium 504 are capable of connecting to external elements via network 514. Processor 502 is configured to execute computer program code 506 encoded in computer-readable storage medium 504 to cause inertial calibration system 500 to be usable for performing a portion or all of the noted processes and/or methods. In one or more embodiments, processor 502 is a central processing unit (CPU), a multi-processor, a distributed processing system, an application specific integrated circuit (ASIC), and/or a suitable processing unit.

Inertial calibration system 500 includes a accelerometer 517 configured to detect angular rate (speed) generated because of the motion a vehicle, such as vehicle 102 in FIG. 1A and FIG. 1B. In some embodiments, the accelerometer 517 is a 3-D accelerometer that senses angular rate along three orthogonal measurement axes, such as X-IMU, Y-IMU-, Z-IMU, discussed above with respect to FIG. 1A, FIG. 1B, FIG. 2A, FIG. 2B, FIG. 3A, FIG. 3B, FIG. 3C.

Inertial calibration system 500 further includes an inclinometer or tilt sensor 519. The inclinometer or tilt sensor 519 is configured to measure tilt angles of a vehicle, such as the vehicle 102 in FIG. 1A and FIG. 1B. The inclinometer or tilt sensor 519 is an example of the inclinometer or tilt sensor in FIG. 1A and FIG. 1B and of the inclinometer or tilt sensor 400 in FIG. 4 in accordance with some embodiments. The inclinometer or tilt sensor 400 is configured to measure tilt angles along three orthogonal measurement axes, such as X-inclinometer, Y-inclinometer, Z-inclinometer, as discussed above with respect to FIG. 3A and FIG. 3B.

In one or more embodiments, computer-readable storage medium 504 is an electronic, magnetic, optical, electromagnetic, infrared, and/or a semiconductor system (or apparatus or device). For example, computer-readable storage medium 504 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, computer-readable storage medium 504 includes a compact disk-read only memory (CD-ROM), a compact disk-read/write (CD-R/W), and/or a digital video disc (DVD).

In one or more embodiments, computer-readable storage medium 504 stores computer program code 506 configured to cause inertial calibration system 500 to be usable for performing a portion or all of the noted processes and/or methods. In one or more embodiments, computer-readable storage medium 504 also stores information which facilitates performing a portion or all the noted processes and/or methods. In one or more embodiments, computer-readable storage medium 504 stores library of parameters 507 (e.g., tilt angles, including recorded tilt angles received from the database) as disclosed herein.

Inertial calibration system 500 includes I/O interface 510. I/O interface 510 is coupled to external circuitry. In one or more embodiments, I/O interface 510 includes a keyboard, keypad, mouse, trackball, trackpad, touchscreen, and/or cursor direction keys for communicating information and commands to processor 502.

Inertial calibration system 500 also includes network device 512 coupled to processor 502. Network device 512 allows inertial calibration system 500 to communicate with network 514, to which one or more other computer systems are connected. Network device 512 includes wireless network interfaces such as BLUETOOTH, WIFI, LTE, 5G, WIMAX, GPRS, or WCDMA or wired network interfaces such as ETHERNET, CAN bus, USB, or IEEE-1364. In one or more embodiments, a portion or all noted processes and/or methods, is implemented in two or more inertial calibration systems 500.

Inertial calibration system 500 is configured to receive information through I/0 interface 510. The information received through I/O interface 510 includes one or more of instructions, data, and/or other parameters for processing by processor 502. The information is transferred to processor 502 via bus 508. Inertial calibration system is configured to receive information related to a UI through I/O interface 510. The information is stored in computer-readable storage medium 504 as user interface (UI) 542.

Figure 6:
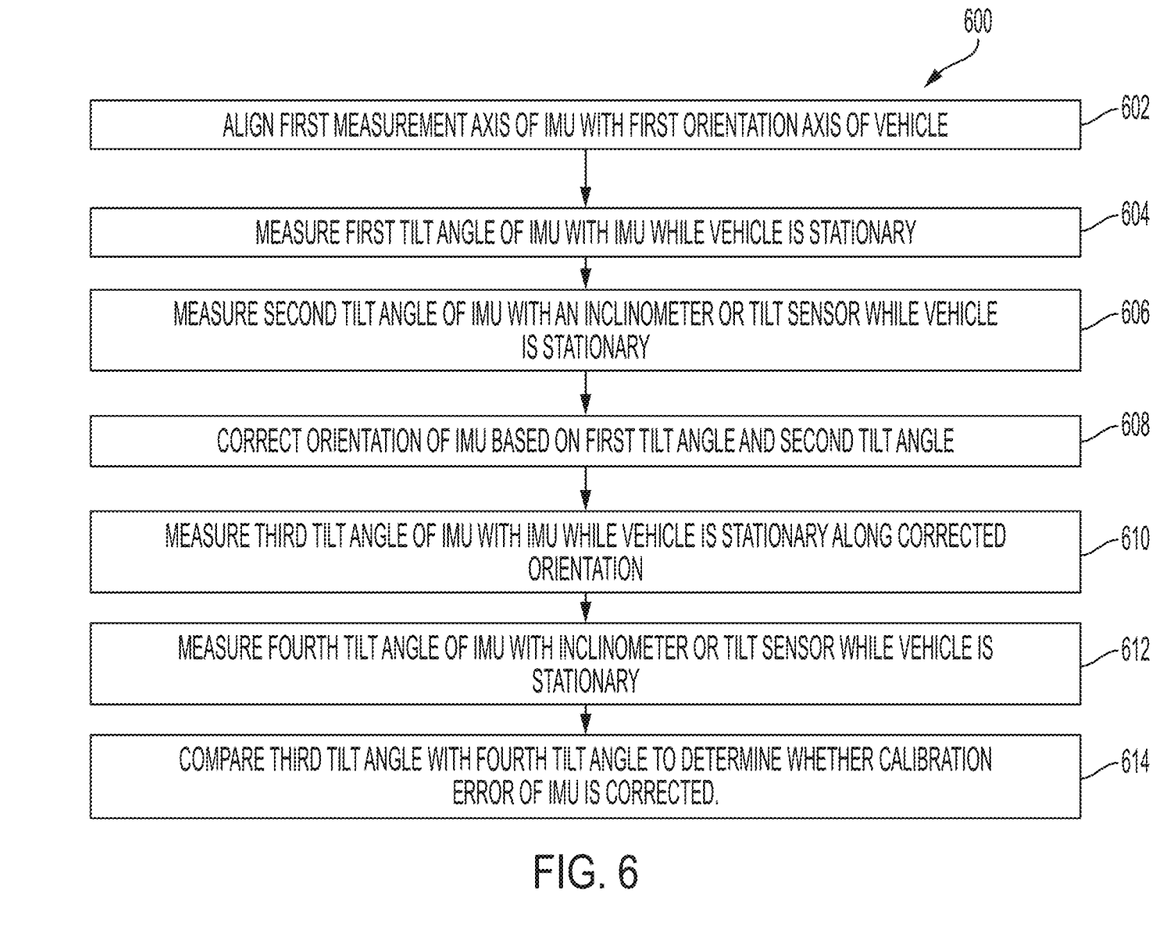
FIG. 6 is a flow diagram of a method of calibrating an IMU, in accordance with some embodiments.

FIG. 6 is a flow diagram 600 of a method of calibrating an IMU, in accordance with some embodiments.

Examples of the IMU being calibrated are IMU 106 in FIG. 1A and FIG. 1B and the inertial calibration system 500 in FIG. 5, in accordance with some embodiments. Flow diagram 600 includes blocks 602-614, in accordance with some embodiments. Flow begins at block 602.

At block 602, a first measurement axis of the IMU is aligned with a first orientation axis of the vehicle. An example of the vehicle is the vehicle 102 in FIG. 1A and FIG. 1B. Examples of the first measurement axis includes the X-IMU, Y-IMU, Z-IMU of FIG. 1A, FIG. 1B, FIG. 2A, FIG. 2B, FIG. 3A, FIG. 3B, in accordance with some embodiments. An example of the orientation axis include X-vehicle, Y-vehicle, Z-vehicle in FIG. 1A, FIG. 1B, FIG. 2A, FIG. 2B. In some embodiments, block 602 is performed prior to block 604-614. Flow then proceeds to block 604.

At block 604, a first tilt angle of the IMU is measured with the IMU while the vehicle is stationary. Examples of the first tilt angle include the grade angle θ and the cant angle Φ of FIG. 1A and FIG. 1B and the grade angle θ-installation and cant angle Φ-installation in FIG. 2A and FIG. 2B, in accordance with some embodiments. In some embodiments, the first tilt angle is measured at a first known location. Flow then proceeds to block 606.

At block 606, a second tilt angle of the IMU is measured with an inclinometer or tilt sensor while the vehicle is stationary. Examples of the second tilt angle include the grade angle θ and the cant angle Φ of FIG. 1A and FIG. 1B and the grade angle θ-inclinometer and cant angle Φ-inclinometer in FIG. 3A and FIG. 3B, in accordance with some embodiments. In some embodiments, the second tilt angle is measured at the same first known location. Flow then proceeds to block 608.

At block 608, the orientation of the IMU is corrected based on the first tilt angle and the second tilt angle. Flow then proceeds to block 610.

At block 610, a third tilt angle of the IMU is measured with the IMU while the vehicle is stationary. Examples of the third tilt angle include the grade angle θ and the cant angle Φ of FIG. 1A and FIG. 1B and the grade angle θ-installation and cant angle Φ-installation in FIG. 2A and FIG. 2B, in accordance with some embodiments. In some embodiments, the third tilt angle is measured at a second known location that is different than the first known location. Flow then proceeds to block 612.

At block 612, a fourth tilt angle of the IMU is measured with an inclinometer or tilt sensor while the vehicle is stationary. Examples of the second tilt angle include the grade angle θ and the cant angle Φ of FIG. 1A and FIG. 1B and the grade angle θ-inclinometer and cant angle Φ-inclinometer in FIG. 3A and FIG. 3B, in accordance with some embodiments. In some embodiments, the third tilt angle is measured at the same second known location. Flow then proceeds to block 614.

At block 614, the third tilt angle and the fourth tilt angle are compared to determine whether a calibration error of the IMU is corrected. In some embodiments, block 602-614 are repeated for both the grade and the cant angles. In this case, a first set of grade and cant angles are measured with the IMU and a second set of grade and cant angles are measured with the inclinometer or tilt sensor.

Figure 7:
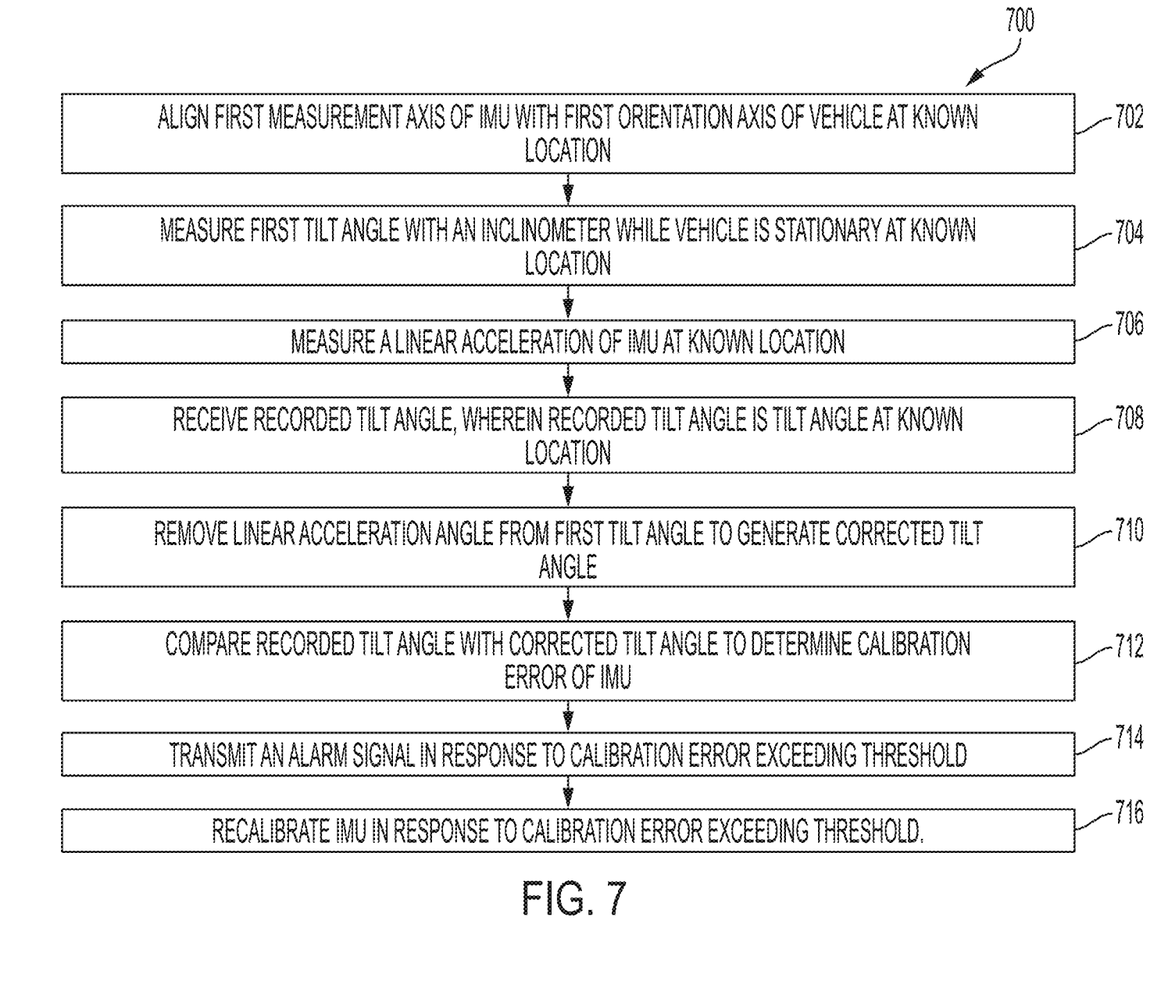
FIG. 7 is a flow diagram of a method of calibrating an IMU, in accordance with some embodiments.

FIG. 7 is a flow diagram 700 of a method of calibrating an IMU, in accordance with some embodiments.

Examples of the IMU being calibrated are IMU 106 in FIG. 1A and FIG. 1B and the inertial calibration system 500 in FIG. 5, in accordance with some embodiments. Flow diagram 700 includes blocks 702-716, in accordance with some embodiments. Flow begins at block 702.

At block 702, a first measurement axis of the IMU is aligned with a first orientation axis of the vehicle at a known location. An example of the vehicle is the vehicle 102 in FIG. 1A and FIG. 1B. Examples of the first measurement axis includes the X-inclinometer, Y-inclinometer, Z-inclinometer of FIG. 1A, FIG. 1B, FIG. 2A, FIG. 2B, FIG. 3A, FIG. 3B, in accordance with some embodiments. An example of the orientation axis includes X-vehicle, Y-vehicle, Z-vehicle in FIG. 1A, FIG. 1B, FIG. 2A, FIG. 2B. In some embodiments, block 702 is performed prior to block 704-714. Flow then proceeds to block 704.

At block 704, a first tilt angle of a vehicle is measured with an inclinometer or tilt sensor while the vehicle is stationary at a known location. An example of the vehicle includes the vehicle 102 in FIG. 1A and FIG. 1B. An example of the inclinometer or tilt sensor include the inclinometer or tilt sensor 110 shown in FIGS. 1A and 1B. Examples of the first tilt angle include the grade angle θ and the cant angle Φ of FIG. 1A and FIG. 1B and the grade angle θ-inclinometer and cant angle Φ-inclinometer in FIG. 3A and FIG. 3B, in accordance with some embodiments. Flow then proceeds to block 706.

At block 706, linear acceleration of the IMU is determined at the known location. In some embodiments, the linear acceleration is measured by the accelerometer. Flow then proceeds to block 708.

At block 708, a recorded tilt angle is received. The recorded tilt angle is a tilt angle at the known location. An example of the recorded tilt angle is included in the parameters 507, in accordance with some embodiments. Flow then proceeds to block 710.

At block 710, the linear acceleration AC component is removed from the first tilt angle to generate a corrected tilt angle. In some embodiments, the recorded tilt angle is corrected by the piezoelectric 3-D accelerometer 402, the MEMS 3-D accelerometer 404, and the differentiator 406 shown in FIG. 4. Flow then proceeds to block 712.

At block 712, the recorded tilt angle is compared with the corrected tilt angle to determine a calibration error of the IMU. Flow then proceeds to block 714.

At block 714, an alarm signal is transmitted in response to the calibration error exceeding a threshold. In example, of the threshold is ±ten (10) arcminutes)(1/6° in some embodiments. Flow then proceeds to block 716.

At block 716, the IMU is recalibrated in response to the calibration error exceeding the threshold. In some embodiments, block 702-704 are repeated for both the grade angles and the cant angles.

In some embodiments, a method of calibrating an Inertial Measurement Unit (IMU) on a vehicle, includes: measuring a first tilt angle of the IMU with the IMU while the vehicle is stationary; measuring a second tilt angle of the IMU with an inclinometer or tilt sensor while the vehicle is stationary; correcting the orientation of the IMU based on the first tilt angle and the second tilt angle. In some embodiments, the first tilt angle and the second tilt angle are measured along a first measurement axis. In some embodiments, the method further includes: measuring a third tilt angle of the IMU with the IMU while the vehicle is stationary along the corrected orientation; measuring a fourth tilt angle of the IMU with the inclinometer or tilt sensor while the vehicle is stationary; comparing the third tilt angle with the fourth tilt angle to determine whether a calibration error of the IMU is corrected. In some embodiments, the first tilt angle and the second tilt angle are measured at a first known location; the third tilt angle and the fourth tilt angle are each measured while the vehicle is stationary at a second known location. In some embodiments, the method further includes: prior to measuring the first tilt angle and the second tilt angle, aligning a first measurement axis of IMU with a first orientation axis of the vehicle, wherein the first tilt angle and the second tilt angle are measured with respect to a second measurement axis of the IMU that is orthogonal to the first measurement axis. In some embodiments, the method further includes: measuring a first set of tilt angles of the IMU with the IMU while the vehicle is stationary, wherein the measuring the first set of tilt angles of the IMU with the IMU while the vehicle is stationary includes the measuring of the first tilt angle of the IMU with the IMU while the vehicle is stationary and wherein the first set of tilt angles are each measured with respect to orthogonal measurement axes; measuring a second set of tilt angles of the IMU with the inclinometer or tilt sensor while the vehicle is stationary, wherein the measuring the second set of tilt angles of the IMU with the inclinometer or tilt sensor while the vehicle is stationary includes the measuring the second tilt angle of the IMU with an inclinometer or tilt sensor while the vehicle is stationary and wherein the second set of tilt angles are each measured with respect to the orthogonal measurement axes.

In some embodiments, the correcting the orientation of the IMU is based on the first set of tilt angles and the second set of tilt angles. In some embodiments, the tilt sensor is collocated with the IMU.

In some embodiments, a method of calibrating an Inertial Measurement Unit (IMU) on a vehicle, includes: measuring a first tilt angle of the IMU with an inclinometer or tilt sensor while the vehicle is stationary at a known location; estimating an orientation angle of the IMU at the known location; receiving a recorded tilt angle, wherein the recorded tilt angle is a tilt angle at the known location; subtracting the orientation angle from the first tilt angle to generate a corrected tilt angle; comparing the recorded tilt angle with the corrected tilt angle to determine a calibration error of the IMU. In some embodiments, the method further includes: transmitting an alarm signal in response to the calibration error exceeding a threshold. In some embodiments, the method further includes: recalibrating the IMU in response to the calibration error exceeding a threshold. In some embodiments, the method further includes: prior to measuring the first tilt angle of the IMU, aligning a first measurement axis of the IMU with a first orientation axis of the vehicle at the known location; wherein the first tilt angle indicates a rotation of the first measurement axis with respect to the first orientation axis. In some embodiments, the method further includes: measuring a second tilt angle of the IMU with the inclinometer or tilt sensor while the vehicle is stationary at the known location, wherein the first tilt angle is measured with respect to a first orientation axis of the vehicle and the second tilt angle is measured with respect to a second orientation axis of the vehicle and wherein the first orientation axis is orthogonal to the second orientation axis; estimating a second orientation angle of the IMU at the known location, wherein the orientation angle is estimated with respect to the first orientation axis and the second orientation angle is estimated with respect to the second orientation axis; receiving a second recorded tilt angle, wherein the second recorded tilt angle is a tilt angle measured at the known location with respect to the second orientation axis and the recorded tilt angle is measured with respect to the first orientation axis; subtracting the second orientation angle from the second tilt angle to generate a corrected second tilt angle; and comparing the second recorded tilt angle with the corrected second tilt angle to determine the calibration error of the IMU. In some embodiments, the orientation angle is measured by a Piezoelectric sensor.

In some embodiments, an apparatus, includes: an Inertial Measurement Unit (IMU); an inclinometer/tilt sensor; at least one non-transitory computer readable medium that stores computer executable instructions.; one or more processors, wherein, in response to executing the computer executable instructions, the one or more processors are configured to: measure a first tilt angle of the IMU with an inclinometer or tilt sensor while the vehicle is stationary at a known location; measure an orientation angle of the IMU at the known location; receive a recorded tilt angle, wherein the recorded tilt angle is a tilt angle at the known location; remove the orientation angle from the first tilt angle to generate a corrected tilt angle; compare the recorded tilt angle with the corrected tilt angle to determine a calibration error of the IMU. In some embodiments, the one or more processors are further configured to: transmit an alarm signal in response to the calibration error exceeding a threshold. In some embodiments, the one or more processors are further configured to recalibrate the IMU in response to the calibration error exceeding a threshold. In some embodiments, the one or more processors are further configured to: prior to measuring the first tilt angle of the IMU, align a first measurement axis of the IMU with a first orientation axis of the vehicle at the known location wherein the first tilt angle indicates a rotation of the first measurement axis with respect to the first orientation axis. In some embodiments, the one or more processors are further configured to: measure a second tilt angle of the IMU with the inclinometer or tilt sensor while the vehicle is stationary at the known location, wherein the first tilt angle is measured with respect to a first orientation axis of the vehicle and the second tilt angle is measured with respect to a second orientation axis of the vehicle and wherein the first orientation axis is orthogonal to the second orientation axis; measure a second linear acceleration angle of the IMU at the known location, wherein the linear acceleration is measured with respect to the first orientation axis and the second acceleration angle is measured with respect to the second orientation axis; receive a second recorded tilt angle, wherein the second recorded tilt angle is a tilt angle measured at the known location with respect to the second orientation axis and the recorder tilt angle is measured with respect to the first orientation axis; remove the second orientation angle from second tilt angle to generate a corrected second tilt angle; and compare the second recorded tilt angle with the corrected second tilt angle to determine the calibration error of the IMU. In some embodiments, the apparatus further includes a Piezoelectric sensor configured to measure the orientation angle.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

What is claimed is:

1. A method of calibrating an Inertial Measurement Unit (IMU) on a vehicle, comprising:
    measuring a first tilt angle of the IMU with the IMU while the vehicle is stationary;
    measuring a second tilt angle of the IMU with an inclinometer or tilt sensor while the vehicle is stationary, wherein the inclinometer or tilt sensor is aligned with the IMU with a predetermined alignment error; and
    correcting the first tilt angle based on the second tilt angle and the predetermined alignment error.

2. The method of claim 1, wherein the first tilt angle and the second tilt angle are measured along a first measurement axis.

3. The method of claim 1, further comprising:
    measuring a third tilt angle of the IMU with the IMU while the vehicle is stationary after correcting the first tilt angle;

measuring a fourth tilt angle of the IMU with the inclinometer or tilt sensor while the vehicle is stationary;
comparing the third tilt angle with the fourth tilt angle to determine whether a calibration error of the IMU is corrected.

4. The method of claim 3, wherein:
the first tilt angle and the second tilt angle are measured at a first known location;
the third tilt angle and the fourth tilt angle are each measured while the vehicle is stationary at a second known location different than the first known location.

5. The method of claim 1, further comprising:
prior to measuring the first tilt angle and the second tilt angle, aligning a first measurement axis of IMU with a first orientation axis of the vehicle, wherein the first tilt angle and the second tilt angle are measured with respect to a second measurement axis of the IMU that is orthogonal to the first measurement axis.

6. The method of claim 1, further comprising:
measuring a first set of tilt angles of the IMU with the IMU while the vehicle is stationary, wherein the measuring of the first set of tilt angles of the IMU with the IMU while the vehicle is stationary comprises the measuring of the first tilt angle of the IMU with the IMU while the vehicle is stationary and wherein the first set of tilt angles are each measured with respect to orthogonal measurement axes;
measuring a second set of tilt angles of the IMU with the inclinometer or tilt sensor while the vehicle is stationary, wherein the measuring the second set of tilt angles of the IMU with the inclinometer or tilt sensor while the vehicle is stationary comprises the measuring of the second tilt angle of the IMU with an inclinometer or tilt sensor while the vehicle is stationary and wherein the second set of tilt angles are each measured with respect to the orthogonal measurement axes.

7. The method of claim 6, wherein the the first set of tilt angles is corrected based on the second set of tilt angles.

8. The method of claim 1, wherein the tilt sensor is collocated with the IMU.

9. A method of calibrating an Inertial Measurement Unit (IMU) on a vehicle, comprising:
measuring AC and DC components of acceleration corresponding to a first tilt angle of the IMU using a first accelerometer in an inclinometer or tilt sensor, which is separate from the IMU, while the vehicle is stationary at a known location;
measuring the AC component of acceleration corresponding to the first tilt angle of the IMU using a second accelerometer in the inclinometer or tilt sensor, at the known location;
receiving a recorded tilt angle, wherein the recorded tilt angle is a tilt angle at the known location;
subtracting the AC component of acceleration measured using the second accelerometer from the AC and DC components of acceleration measured using the first accelerometer to generate a corrected tilt angle; and
comparing the recorded tilt angle with the corrected tilt angle to determine a calibration error of the IMU.

10. The method of claim 9, further comprising:
transmitting an alarm signal in response to the calibration error exceeding a threshold.

11. The method of claim 9, further comprising:
recalibrating the IMU in response to the calibration error exceeding a threshold.

12. The method of claim 9, further comprising:
prior to measuring the first tilt angle of the IMU, aligning a first measurement axis of the IMU with a first orientation axis of the vehicle at the known location;
wherein the first tilt angle indicates a rotation of the first measurement axis with respect to the first orientation axis.

13. The method of claim 9, further comprising:
measuring a second tilt angle of the IMU with the inclinometer or tilt sensor while the vehicle is stationary at the known location, wherein the first tilt angle is measured with respect to a first orientation axis of the vehicle and the second tilt angle is measured with respect to a second orientation axis of the vehicle and wherein the first orientation axis is orthogonal to the second orientation axis;
measuring a second orientation angle of the IMU at the known location, wherein the AC component of acceleration corresponding to the first tilt angle measured using the second accelerometer is measured with respect to the first orientation axis and the second orientation angle is measured with respect to the second orientation axis;
receiving a second recorded tilt angle, wherein the second recorded tilt angle is a tilt angle measured at the known location with respect to the second orientation axis and the recorder tilt angle is measured with respect to the first orientation axis;
subtracting the second orientation angle from the second tilt angle to generate a corrected second tilt angle; and
comparing the second recorded tilt angle with the corrected second tilt angle to determine the calibration error of the IMU.

14. The method of claim 9, wherein the AC component of acceleration corresponding to the first tilt angle is measured by a Piezoelectric sensor in the second accelerometer.

15. An apparatus for a vehicle, the apparatus comprising:
an Inertial Measurement Unit (IMU);
an inclinometer or tilt sensor, the inclinometer or tilt sensor being separate from the IMU and including a first accelerometer and a second accelerometer;
at least one non-transitory computer readable medium that stores computer executable instructions;
one or more processors, wherein, in response to executing the computer executable instructions, the one or more processors are configured to:
measure AC and DC components of acceleration corresponding to a first tilt angle of the IMU with using the first accelerometer while the vehicle is stationary at a known location;
measure the AC component of acceleration corresponding to the first tilt angle of the IMU using the second accelerometer, at the known location;
receive a recorded tilt angle, wherein the recorded tilt angle is a tilt angle at the known location;
subtract the AC component of acceleration measured using the second accelerometer from the AC and DC components of acceleration measured using the first accelerometer to generate a corrected tilt angle; and
compare the recorded tilt angle with the corrected tilt angle to determine a calibration error of the IMU.

16. The apparatus of claim 15, wherein the one or more processors are further configured to:
transmit an alarm signal in response to the calibration error exceeding a threshold.

17. The apparatus of claim 15, wherein the one or more processors are further configured to:
recalibrate the IMU in response to the calibration error exceeding a threshold.

18. The apparatus of claim 15, wherein the one or more processors are further configured to:
prior to measuring the first tilt angle of the IMU, align a first measurement axis of the IMU with a first orientation axis of the vehicle at the known location;
wherein the first tilt angle indicates a rotation of the first measurement axis with respect to the first orientation axis.

19. The apparatus of claim 15, wherein the one or more processors are further configured to:
measure a second tilt angle of the IMU with the inclinometer or tilt sensor while the vehicle is stationary at the known location, wherein the first tilt angle is measured with respect to a first orientation axis of the vehicle and the second tilt angle is measured with respect to a second orientation axis of the vehicle and wherein the first orientation axis is orthogonal to the second orientation axis;
measure a second orientation angle of the IMU at the known location, wherein the AC component of acceleration corresponding to the first tilt angle measured using the second accelerometer is measured with respect to the first orientation axis and the second orientation angle is measured with respect to the second orientation axis;
receive a second recorded tilt angle, wherein the second recorded tilt angle is a tilt angle measured at the known location with respect to the second orientation axis and the recorded tilt angle is measured with respect to the first orientation axis;
subtract the second orientation angle from the second tilt angle to generate a corrected second tilt angle; and
compare the second recorded tilt angle with the corrected second tilt angle to determine the calibration error of the IMU.

20. The apparatus of claim 15, wherein the second accelerometer includes a Piezoelectric sensor configured to measure the AC component of acceleration corresponding to the first tilt angle.

* * * * *